Sept. 6, 1927.
E. J. COOK
1,641,157
WEATHER STRIP FOR SLIDING CLOSURES
Filed March 19, 1923
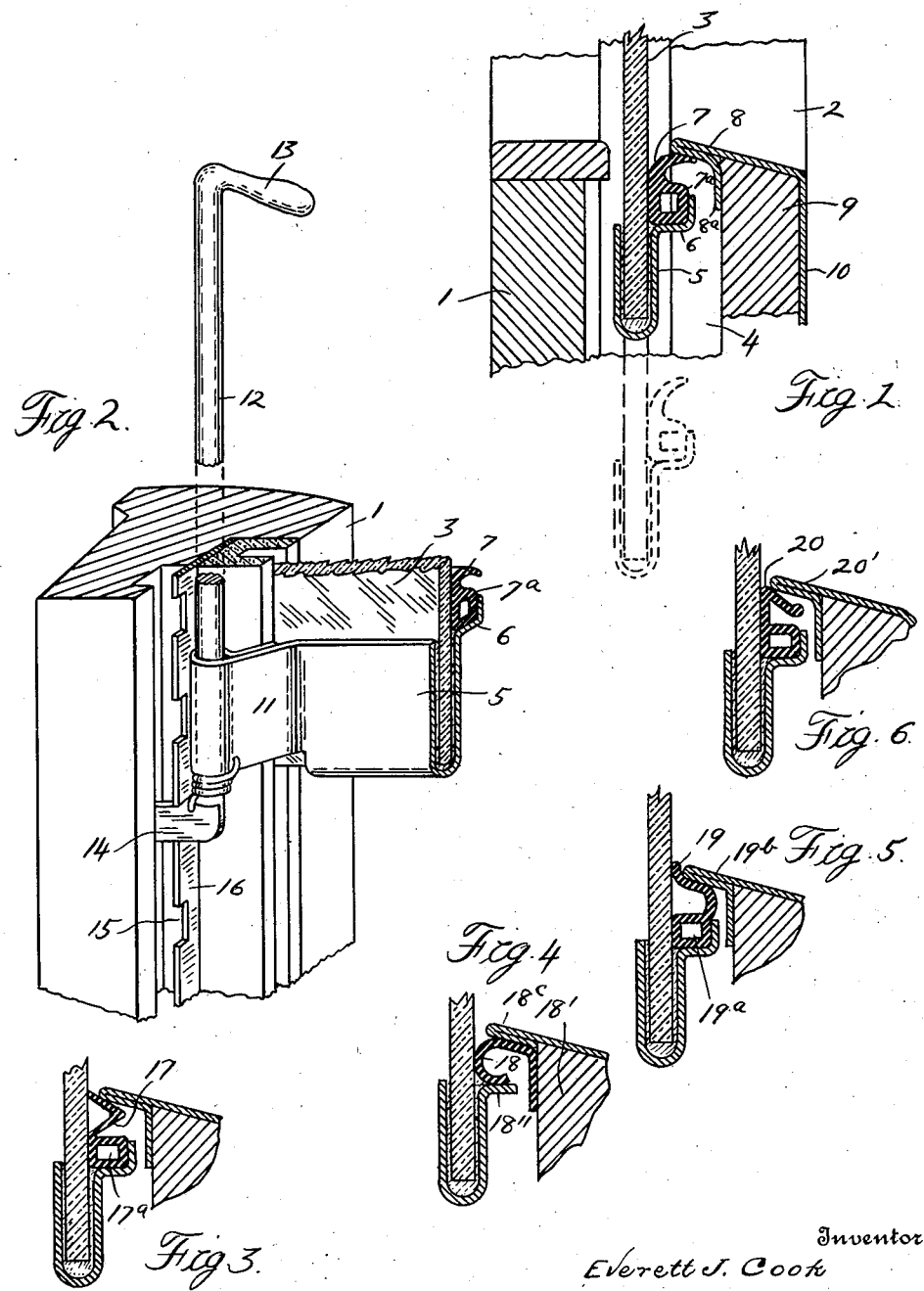
Inventor
Everett J. Cook Patented Sept. 6, 1927.

1,641,157

UNITED STATES PATENT OFFICE.

EVERETT J. COOK, OF TOLEDO, OHIO, ASSIGNOR TO THE DURA COMPANY, OF TOLEDO, OHIO, A CORPORATION OF DELAWARE.

WEATHER STRIP FOR SLIDING CLOSURES.

Application filed March 19, 1923. Serial No. 626,209.

This invention relates to weather strips and more particularly to weather strips for use on the sliding closures of vehicle windows.

The object of the invention is to provide a weather strip adapted to be mounted upon the sliding closure of a window and adapted in the closed position of said window to engage a flexible tongue with a coacting fixed strip, said tongue providing for a sealing engagement within a certain range of the sliding travel of a closure that is particularly desirable when the limiting closed position of the closure may vary somewhat in different installations.

In the drawings:—

Figure 1 is a cross sectional view of a sealing portion of a vehicle window showing sealing engagement established by the improved weather strip;

Figure 2 is a perspective interior view of the window showing a latch means for the same;

Figures 3, 4, 5 and 6 are views similar to Figure 1, but disclosing alternative forms of the weather strip.

In these views, the reference character 1 designates a frame member having a window opening 2 and provided with a vertically sliding glass plate 3 forming a closure for said opening. Said closure as it is lowered is adapted to enter a well or chamber 4 formed in the frame 1 below the opening 2. The lower edge of the glass 3 is embraced by a channel shaped sheet metal strip 5 having one of its edges extended and laterally offset as indicated at 6 to provide a seat for a flexible weather strip 7, 7ª, formed preferably of rubber. The lower portion of said strip preferably is tubular as indicated at 7ª and the upper portion is of an elongated tapered flexible tongue 7. This tongue has imparted to it a set such that it curves considerably away from the glass 3 (as is shown in dash lines in Figure 1) even when disengaged from the coacting metal weather strip 8. Said tongue is deflected to an increased curvature by engagement with the strip 8 when the closure is in fully raised position, as is seen in full lines in Figure 1. The strip 8 is of sheet metal having a portion superposed upon the frame element 9 and having a double ply portion projecting from said frame element into a slightly spaced relation to the sliding closure. An edge portion of the strip is interiorly secured to the frame member 9, as indicated at 8ª. In the illustrated embodiment of the invention, the strip 8 is shown as an integral portion of the sheet metal panel 10 which forms the outer wall for the chamber 4. At one end of the channel strip 5 a journal bearing 11 is formed thereupon and is engaged by the lower end portion of a control rod 12, the upper end of said rod being provided with a handle 13 and the lower end with a latch element 14 which is engageable by rotation of said rod with any one of a plurality of notches 15 in a vertically elongated latch bar 16 carried by one of the uprights of the frame 1. The described latch mechanism, while no new feature, is illustrated to more clearly disclose the utility of the tongue 7. The raised limiting position of the closure 3 must be determined by engagement of the latch element 14 with one of the notches 15. Heretofore, where coacting weather strips on a sliding closure and stationary frame have been employed in a construction substantially as shown, it has been found that in the upper limiting position of the closure determined by entrance of the latch 14 in one of the notches 15 the weather strips have not always been properly engaged. In other words, it has been necessary to secure the stationary notched latch strip to the frame at a definite elevation in order to insure proper sealing engagement between the weather strips. The described invention considerably expedites assembly of vehicle windows having such latch means by insuring a sealing engagement in the raised position of the closure within a considerable range of movement of said closure, the long tongue 7 flexing to maintain the seal throughout such range of movement. Thus, the latch elements may be applied to the described window without accurate reference to the raised position of the closure.

The construction shown in Figure 3 employs a weather strip having the tubular lower portion 19 and having the flexible tongue 17 bent at an acute angle intermediately and forming a reverse acute angle with said tubular body. Thus, the described tongue has two bending axes and may undergo a considerable yielding vertically and still maintain proper sealing engagement with the coacting fixed strip.

The construction shown in Figure 4 employs a weather strip 18 formed of sheet rubber secured to the stationary frame member 18' beneath the projecting metal strip 18ᶜ, the edge portion of said strip 18 adjacent the glass being curved downwardly to a semi-cylindrical shape so as to bear on the glass and at the same time have contact with a bent edge portion 18" of the channel strip embracing the glass when the latter is raised. The semi-cylindrical portion of the weather strip 18 yields correspondingly to the tongues 7 or 17, previously described, to maintain the weather seal without limiting the closure to a definite raised position.

The construction shown in Figure 5 provides a tubular rubber member 19ᵃ carried by the closure correspondingly to the constructions already described and having the flexible tongue 19 projecting from an edge of said tubular element remote from the glass and curved to terminally engage between the stationary metallic weather strip 19ᵇ and the closure.

The construction shown in Figure 6 employs a tubular elastic base portion for the sealing member carried by the closure and forms said member with the sealing tongue 20 which projects similarly to the first described construction but bends said tongue at an acute angle upon an intermediate axis, the apex of the angle being engageable between the closure and the stationary sealing element 20' to establish a seal.

What I claim as my invention is:—

1. The combination with a vertically slidable closure, a frame member extending adjacent thereto and a weather strip upon said frame member extending toward but spaced from said closure, of means for establishing a weather seal between said closure and weather strip without limiting said closure to a definite closed position, said means including a weather strip carried by said closure having a flexible tongue with a portion engageable with the lower face of said first-mentioned weather strip and another portion adapted to extend upwardly between said closure and the adjacent edge of said first-mentioned weather strip in the closed position of said closure.

2. The combination with a vertically slidable closure, a frame member and a weather strip upon said frame member and extending toward but spaced from said closure, of means for establishing a weather seal between said closure and weather strip without limiting said closure to a definite closed position, said means including a weather strip carried by said closure having an elongated flexible tongue engageable with the lower face of said first-mentioned weather strip and terminating between said closure and the adjacent edge of said first-mentioned weather strip in the closed position of said closure.

3. The combination with a vertically slidable closure, a channel member secured to the lower edge of said closure and having a laterally offset portion and a frame member extending adjacent to said closure, of means for establishing a weather seal between said closure and frame member without limiting said closure to a definite closed position, said means including a resilient weather strip having a tubular body member seated upon said laterally offset portion and an integral tongue having portions extending upwardly and at an angle to said closure, and a sealing element upon said frame member projecting toward said closure and having its lower face engageable with the angularly extending portion of said tongue to establish a weather seal.

In testimony whereof I affix my signature.

EVERETT J. COOK.